(12) United States Patent
Kashy

(10) Patent No.: US 6,607,010 B1
(45) Date of Patent: Aug. 19, 2003

(54) FLEXIBLE COLLAPSE-RESISTANT AND LENGTH-STABLE VACCUM HOSE

(75) Inventor: David H. Kashy, Yorktown, VA (US)

(73) Assignee: Southeastern Universities Res. Assn, Inc., Newport News, VA (US)

( * ) Notice: Subject to any disclaimer, the term of this patent is extended or adjusted under 35 U.S.C. 154(b) by 0 days.

(21) Appl. No.: 09/852,854

(22) Filed: May 10, 2001

(51) Int. Cl.[7] ............................................... F16L 11/00
(52) U.S. Cl. ....................... 138/121; 138/127; 138/138; 138/142
(58) Field of Search ..................... 138/121, 125, 138/126, 127, 137, 138, 142

(56) References Cited

U.S. PATENT DOCUMENTS

| | | | | |
|---|---|---|---|---|
| 3,773,087 A | * | 11/1973 | Katayama | 138/120 |
| 4,376,229 A | * | 3/1983 | Maul et al. | 138/121 |
| 4,452,279 A | * | 6/1984 | Atwell | 138/126 |
| 4,495,134 A | * | 1/1985 | Ouchi et al. | 138/125 |
| 4,854,416 A | * | 8/1989 | Lalikos et al. | 138/131 |
| 5,077,107 A | * | 12/1991 | Kaneda et al. | 138/125 |
| 5,164,237 A | * | 11/1992 | Kaneda et al. | 138/125 |
| 5,545,151 A | * | 8/1996 | O'Connor et al. | 138/138 |
| 5,562,126 A | * | 10/1996 | Briand et al. | 138/127 |
| 5,667,499 A | * | 9/1997 | Welch et al. | 138/125 |
| 5,803,128 A | * | 9/1998 | Reed | 138/123 |
| 5,827,377 A | * | 10/1998 | Crum et al. | 148/442 |
| 5,901,754 A | * | 5/1999 | Elsasser et al. | 138/121 |
| 5,927,345 A | * | 7/1999 | Samson | 138/127 |
| 6,062,266 A | * | 5/2000 | Burkhardt | 138/114 |
| 6,220,023 B1 | * | 4/2001 | Ezzeddini et al. | 138/118 |

* cited by examiner

Primary Examiner—James Hook

(57) ABSTRACT

A hose for containing a vacuum, which hose has an impermeable flexible tube capable of holding a vacuum and a braided or interwoven flexible interior wall, said wall providing support to said interior wall of said impermeable flexible tube. Optionally, an exterior braided or woven wall may be provided to the hose for protection or to allow the hose to be used as a pressure hose. The hose may delimit a vacuum space through which may travel a thermal transfer line containing, for example, cryogenic fluid.

3 Claims, 3 Drawing Sheets

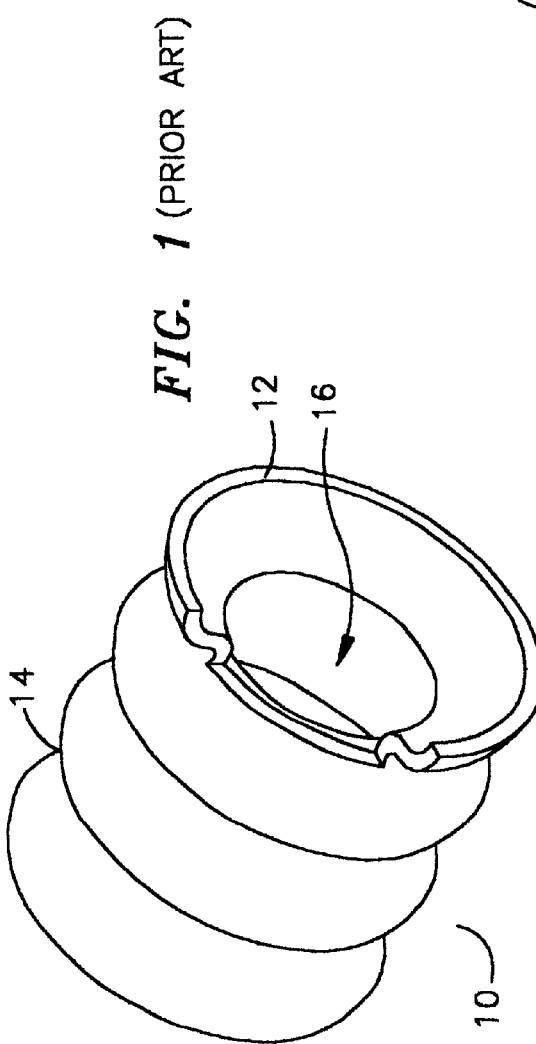
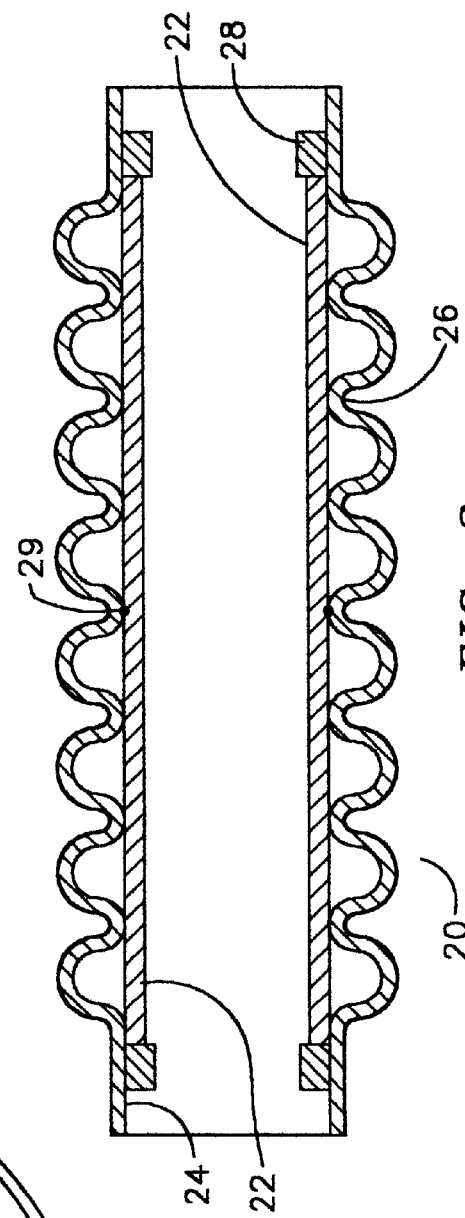

FLEXIBLE COLLAPSE-RESISTANT AND LENGTH-STABLE VACCUM HOSE

FEDERALLY SPONSORED RESEARCH AND DEVELOPMENT

The United States of America may have certain rights to this invention under Management and Operating Contract No. DE-AC05-84ER 40150 from the Department of Energy.

CROSS REFERENCE TO RELATED APPLICATIONS

There are no related applications.

BACKGROUND OF THE INVENTION

1. Field of the Invention

This invention relates generally to hoses and flexible lines capable of enduring an applied vacuum, and specifically to coaxial hoses for cryogenic transfer.

2. Description of the Related Art

It is well known in many fields of art to apply vacuum pressure. Vacuum apparatuses are used in such diverse fields as food processing, electronics component manufacture, consumer products manufacture, and myriad cleaning, finishing, cutting, grinding and metalworking processes. Technology has applications in all processes carried out at less than normal atmospheric pressure. Physical manipulation of objects, such as gripping, lifting, shaping and molding of products are conducted by beneficial use of a transmitted vacuum. Various vacuum lifters are known to raise heavy objects. Two popular versions are the Anver® VM and VB Series of Vacuum lift systems, from Anver Corporation, Hudson, Mass., 01749, which enable virtually anyone to handle weighty objects easily.

Cryogenic and thermal storage is enhanced by the isolation of a relatively warmer or cooler region by a vacuum, as is well known and illustrated by the Thermos® Brand of insulated containers.

Vacuum systems are used in automobiles and other motorized conveyances to actuate various systems. Frequently, the vacuum is generated by an engine port intake. Reliable hoses are a must for such systems.

A plethora of analytical methods rely upon a vacuum field for the accurate analysis of minute samples of material injected into scanning chambers or the like. Mass spectrographs, scanning electron microscopes, and vapor analyzing devices such as combustion chambers or the like are frequently evacuated via vacuum pumps.

Vacuum pumps are well known in the art. There are many commercially available designs to provide the vacuum required for each application. Among them are rotary vane vacuum pumps, water ring vacuum pumps, regenerative blowers that function as vacuum sources, rocker arm vacuum pumps, and diaphragm pumps. They are widely available from such varied manufacturers as Busch®, Becker®, Rieschle®, Thomas®, and Gast®, among others.

Most applications, of course, require a conduit connecting the pump and the chamber or equipment to be evacuated; in many applications the conduit is a hose or other flexible line.

Many commercially available hose products are available. A variety of plastic spiral wire reinforced hoses are marketed by Anver Corp, of Hudson, Mass. under the HP Series, FT Series, and HS series product lines. These are primarily for vacuum tube lifter systems.

SIS Vacuum Systems (Ringoes, N.J.) markets a steel wire reinforced vacuum hose which is said to be anti-kinking and non collapsible.

It is also known to use metal rods on the interior or exterior of the vacuum hose to provide the necessary structural rigidity for avoiding collapse. Needless to say, metal rods have a very limited flexibility and cannot be used for, e.g. traversing a corner or the like.

In extremes of pressure and temperature, such as are frequently generated in cryogenic applications, it is desirable to have the hose maintain its dimensions as nearly as possible. In most of the prior art available, unless the hoses are completely rigid, they tend to shorten as higher and higher loads are placed upon the exterior walls of the hose by the atmosphere. This can be degrading to the hose and the equipment over time, especially if the equipment is a sensitive piece of analytical equipment.

Further, in view of the special nature of the cryogenics field, if the coaxial hoses frequently used to transfer cryogenic fluids are subjected to excessive motion and collapse, much of the insulation provided by the vacuum is lost. A solution to this problem is needed.

SUMMARY OF THE INVENTION

The present invention provides an improved dimensionally stable hose for applying a vacuum. A central, convoluted hose is provided with a braided or woven sleeve internally, externally, or both. The sleeve is affixed to the ends of the convoluted hose and provides not only protection against collapse and expansion, but also assures that the convoluted hose will not change dimensionally lengthwise.

It is, therefore, an object of this invention to provide an improved flexible hose for vacuum distribution.

It is a further object of this invention to provide a vacuum distribution hose, which is superior in performance to other hoses used for the same purpose.

Another object of the present invention is to provide a vacuum distribution hose which is dimensionally stable during use and when not placed under a barometric pressure disparity or imbalance across the hose.

Yet another object of the present invention is to provide a superior vacuum-insulated cryogenic vacuum hose.

Further objects are to achieve the above with an apparatus and device that is sturdy, can be compact, is safe and reliable, and improves a system's durability and efficiency by reducing losses and maintenance costs.

One of skill in the art, having regard for this disclosure, will, without departing from the scope and spirit of the invention disclosed herein, now readily discern other advantages and objects, which may be achieved by practicing the invention disclosed herein.

The specific nature of the invention, as well as other objects, uses, and advantages thereof, will more clearly appear from the description when read in conjunction with the accompanying drawings, the different views of which are not necessarily scale drawings.

The examples, drawings, and description contained herein are meant in an illustrative and exemplary way and not by means of limitation. The invention is limited only by the claims which follow.

BRIEF DESCRIPTION OF THE DRAWINGS

FIG. 1 is a typical prior art vacuum hose shown in partial cutaway perspective.

FIG. 2 is a side view showing the orientation of various components of one embodiment of the vacuum hose of the present invention.

DESCRIPTION OF THE PREFERRED EMBODIMENT

Figure 3:
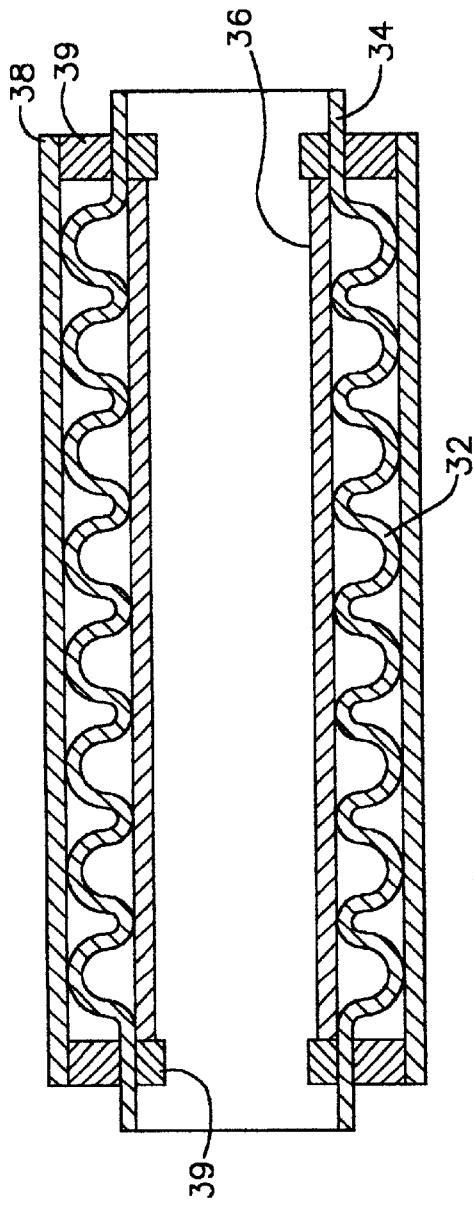
FIG. 3 is a side view showing the orientation of various components of another embodiment of the vacuum hose of the present invention.

Referring now to the drawings, FIG. 1 shows a cutaway perspective of the prior art type of vacuum hose 10. It is formed with a corrugated style sidewall 12, having periodic circular indentations 14 around the periphery of the of the vacuum distribution hose 10. A central void 16, is the conduit for the vacuum. The circular indentations provide a degree of lateral rigidity, and may be further reinforced with spiral or periodic reinforcements, usually an embedded spiral wire or periodic ring system. However, in the longitudinal direction, there is little or no support, and as a vacuum hose 10 is evacuated by the action of a pump (not shown) the surrounding air will impinge upon the indentations, causing some longitudinal contraction.

Turning now to FIG. 2, the inventive solution to such a problem is easily viewed. The vacuum hose 20 is provided with an internal reinforcing braided wall 22. The braided wall is preferably firmly seated within the internal diameter of the vacuum hose such that it supplies a reinforcing force against the interior wall 24 of the vacuum hose 20. The braided wall is preferably seated against the internal wall of the vacuum hose with enough compressive force such that it substantially remains in place when the hose is flexed, bent, moved or otherwise manipulated. In an especially preferred embodiment, the braid is compressed axially, then it is preferably welded by weld ring 28 into place along the ends of the vacuum hose 20. This then allows the apparatus to better resist axial compression when a vacuum is applied. Other means of attachment known by those of skill in the art may also be used, including but not limited to using various adhesives and bonding agents.

The vacuum tube preferably has circular indentations 26 which provide additional support and flexibility to the vacuum hose. Optionally, the braided wall 22 is spot-welded or otherwise affixed to the interior wall of the vacuum hose 20 in additional locations 29 to provide less relative motion of the parts of the vacuum hose, but not to an excessive degree which could cause an overly rigid hose to be formed or excessive leak sources.

The vacuum hose, for ease of manufacture, may be made from an extrudable material. However, the hose can be of any suitable natural and/or synthetic polymeric material such as rubber, neoprene, nylon, rayon, polyethylene, polyvinylchloride, polypropylene, mixtures and/or copolymers thereof and the like. Preferred plastic materials for use in the preformed hose of the invention are fluorinated hydrocarbons, particularly those known as Teflon®, such as polytetrafluoroethylene, and copolymers of tetrafluoroethylene and hexafluoropropylene and the like.

However, such compounds can become brittle in extreme cold situations as may be found in cryogenic applications. The preferred material, especially for very low temperature applications, is a metal, preferably one with a low coefficient of thermal expansion. Suitable metals for the convoluted metal hose include steel (preferably stainless), aluminum, titanium, copper, and various alloys including the flexible alloys described hereinafter.

If both the reinforcing braided wall and the hose are thermoplastic, plastic welds or adhesives may be used to attach the ends of the hose to the ends of the braid. Suitable thermoplastic elastomers (such as Hytrel®) and ethyl vinyl acetate (EVA) are optional choices for such an adhesive.

The braided reinforcing wall is preferably made of a rigid wire. Various wires may be used, of metal, rigid plastics, etc. The rigid reinforcing wire should be compatible with the materials, which might be within the interior space of the vacuum hose. For example, if the hose has a dual functionality of carrying fluids under pressure, the reinforcing wires should be inert to the fluid, and should not become overly brittle if the fluid is cold, or melt when the fluid is hot.

Suitable wire includes metal wires of steel (preferably Haynes® stainless, e.g. SS304, SS308, SS 316, SS318, SS 321, etc.), aluminum, copper, brass, nickel, and various other metals or alloys such as tungsten alloys or iron aluminides. Low temperature brittleness is preferably avoided in cryogenic applications.

The class of alloys known as super-elastic alloys is also suitable for use in the present invention, providing exceptional flexibility when used in a flexible hose application. Preferred super-elastic alloys include the class of titanium/nickel materials known as nitinol—alloys discovered by the U.S. Navy Ordnance Laboratory. These materials are discussed at length in U.S. Pat. No. 3,174,851 to Buehler et al., U.S. Pat. No. 3,351,463 to Rozner et al., and U.S. Pat. No. 3,753,700 to Harrison et al., which are incorporated herein by reference. Other super-elastic or high performance alloys suitable for this use include M35N, SYNTACOBEN, or ELGELOY and the like.

The wires of the braid may vary widely in gauge, so long as they are suitably thick to provide the minimum reinforcement necessary to obtain the benefits of the instant invention. Gauges that are suitable for use in this invention are desirably between 0.25 mil and 35 mil (preferably 0.25–0.50 mils) in thickness, but thicknesses beyond this range may also be used.

Turning now to FIG. 3, an alternative embodiment of the present invention is seen. The vacuum hose 30 in this alternative embodiment is capable of dual function, both as a vacuum hose and as a pressure hose. The convoluted hose 32 has hose cuff 34 at either end. Welded to both the interior and exterior of the hose cuff 34 are braided reinforcing walls. Interior braided reinforcing wall 36 is seated within the convoluted hose 32, and exterior braided reinforcing wall 38 is seated without the convoluted hose 34. Welds 9 and weld rings 39 keep the reinforcing walls in place.

Figure 4:
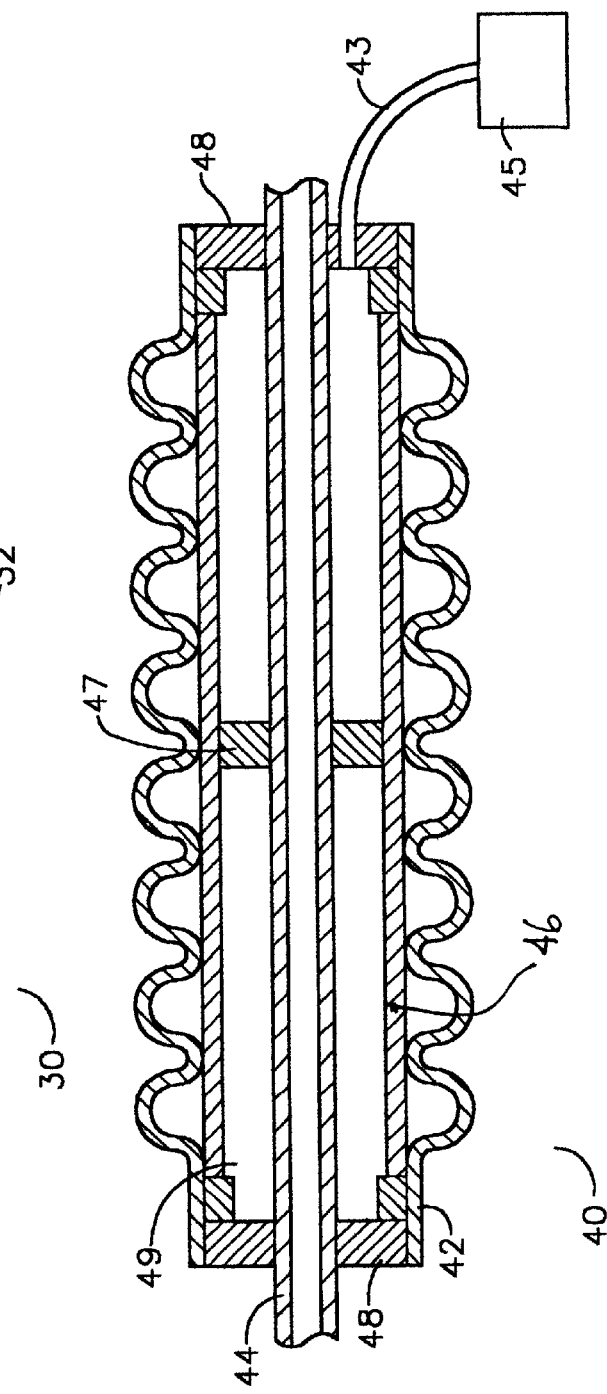
FIG. 4 is a side view of a cryogenic insulated hose according to the present invention.

FIG. 4 illustrates yet another alternative embodiment of the present invention. Thermal transmission hose 40 is configured for the insulated transfer of thermal liquids, be they cryogenic, or heated. The convoluted hose 42 has within its interior a thermal fluid transfer line 44. The thermal fluid transfer line may be part of a cryogenic fluid transfer system or the like, or a heated fluid transfer system. As vacuum is a preferred insulation mechanism, a source of vacuum 45 is attached by a vacuum hose 43 Preferably maintained in spaced relation from the thermal fluid transfer line 44 is braided reinforcing wall 46. Spacers 47 may be employed to keep the thermal fluid transfer line 44 separate from the braided reinforcing wall 46 and the convoluted hose 42. The spacers may be plastic, rubber, or other material rings. Most preferably the rings have a high insulting effect, e.g. a very low thermal transfer rate.

At each end of the vacuum hose, plugs 48 seal the convoluted hose 42 and the thermal transfer fluid line 44 to create a void 49. Void 49 may be evacuated by a connected source of vacuum 45.

Figure 5:
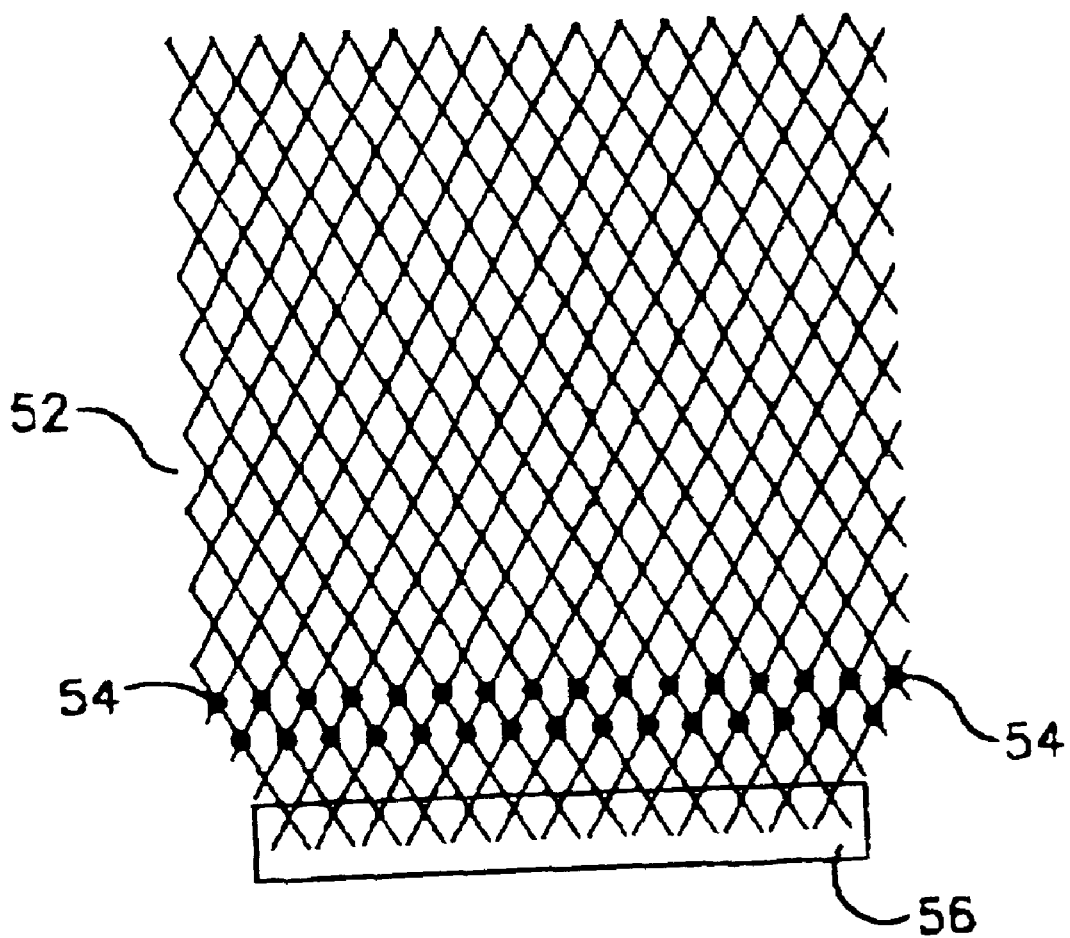
FIG. 5 is a frontal view of an exemplary reinforced braid.

FIG. 5 illustrates a braided sheath. The wires may be merely woven together, or they may optionally be point welded together as is known in the art and illustrated at 54. Such point welding provides additional dimensional stability, as the braided wires cannot slip over each other. This does tend to reduce flexibility, but the level of welding may be adjusted to provide additional support without overly sacrificing flexibility. In FIG. 5, the braided wall is also seen as tapered, such that it may be welded flush with the convoluted wall of the vacuum hose at weld ring 56.

Optionally, additional external sheathing as is known in the art may be provided to protect and give abrasion resistance for the hose. The sheathing may be of braided material or a solid sheath; and preferably is resistant to lubricants, solvents, sharp objects, impact compression, and other hazards of the workplace. The casing is pliable, as are the other components of the vacuum hose.

The vacuum hose may be fitted with threaded or non-threaded couplings at its end and included in a vacuum distribution system with other joined hoses, connectors, sources of vacuum, etc.

The restrictive description and drawing of the specific examples above do not point out what an infringement of this patent would be, but are to enable one skilled in the art to make and use the invention. Various modifications can be made in the construction, material, arrangement, and operation, and still be within the scope of my invention. The limits of the invention and the bounds of the patent protection are measured by and defined in the following claims.

What is claimed is:

1. A flexible, collapse-resistant hose for vacuum distribution, comprising:

an impermeable flexible convoluted metal tube capable of holding a vacuum, said tube having an interior wall and an exterior wall, a pair of ends, and defining a conduit there through, and a braided metal wire flexible interior wall, said interior wall being affixed to the interior of said collapse-resistant tube by welding at each end of the tube, said braided metal wire flexible interior wall providing support to said interior wall of said impermeable flexible tube.

2. A flexible, collapse-resistant hose as claimed in claim 1, further comprising a braided metal wire flexible exterior wall welded to the exterior of said tube.

3. A flexible, collapse-resistant hose as claimed in claim 1, further comprising a thermal fluid transfer line running through said conduit.

* * * * *